June 7, 1932.  L. S. SHELDRICK  1,862,098
TRANSMISSION
Original Filed March 22, 1930
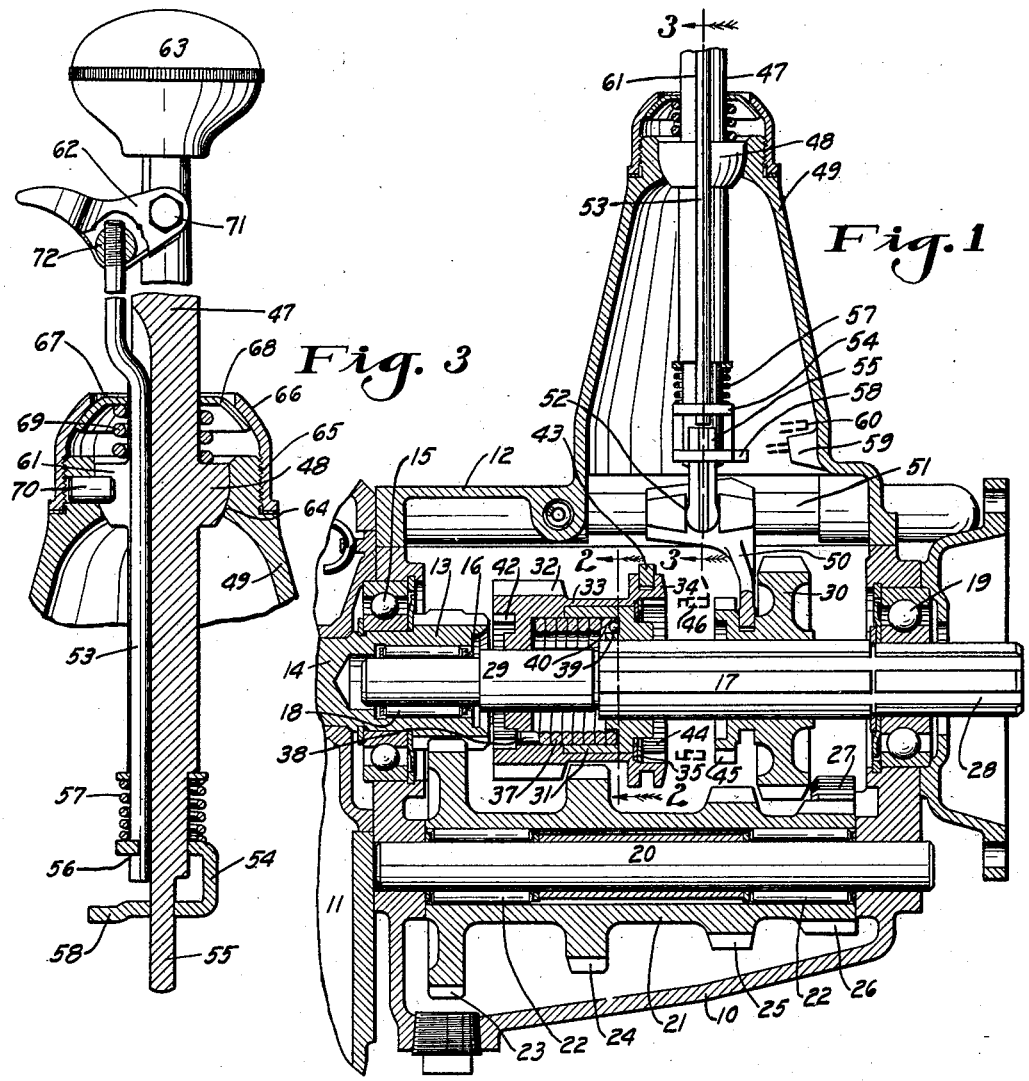
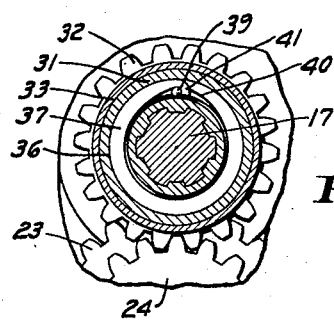
INVENTOR.
L. S. Sheldrick.
BY
ATTORNEY.
Witness.
E. C. McRae.

Patented June 7, 1932

1,862,098

UNITED STATES PATENT OFFICE

LAURENCE S. SHELDRICK, OF DEARBORN, MICHIGAN, ASSIGNOR TO FORD MOTOR COMPANY, OF DEARBORN, MICHIGAN, A CORPORATION OF DELAWARE

TRANSMISSION

Original application filed March 22, 1930, Serial No. 437,988. Divided and this application filed October 27, 1930. Serial No. 491,395.

This is a division of my co-pending application, Serial #437,988, filed March 22, 1930.

The object of my invention is to provide an automobile transmission having three forward speeds and one reverse speed and which operates on the sliding gear principle.

A further object of my invention is to provide such a sliding gear transmission with means whereby it may be silently shifted from the third or direct drive speed back into the second speed even while the car is in motion. The purpose of such silent shifting is to facilitate handling the car in traffic. With my improved transmission the car may be slowed down at intersections, on account of cross traffic or traffic lights, to about ten or fifteen miles an hour and when the intersection is reached if the driver is given the right of way, he may then silently and easily shift into the second speed gear so that maximum acceleration may be obtained.

With the ordinary sliding gear transmission it is almost impossible for the average driver to shift from direct speed to second speed while the car is in motion without grinding and clashing the transmission gears. The reason for this is that when such shift is made the engine speed must be increased on account of the increased gear ratio during the interval between the throwing out of the clutch and the shifting of the gears. The average driver is accustomed to shifting the transmission gears from first speed upwards. During such a normal shift it is necessary to reduce the speed of the engine during the interval between operating the clutch and shifting the gears by releasing the accelerator pedal. This method of gear shifting becomes a fixed procedure with the average driver so that when a shift from direct to second speed is attempted grinding and clashing of the gears invariably results because of the much higher speed of the normally driven gear over the engine driving gear.

My improved transmission may be shifted silently from high gear to second gear at any time, either while the car is stationary or while it is in motion, without clashing the gears or without any special procedure by the driver. I provide an overrunning clutch between the engine driving gear and the driven shaft which is in operation during second and direct speeds and which allows the driven shaft to overrun the engine to compensate for the reduced engine speed so that no clashing of the gears will result.

It will be noted that I have placed my overrunning clutch in operation between the engine and the drive shaft both in second speed and in direct speed. The purpose of the overrunning clutch in second speed has been described, i. e., to prevent clashing of the gears; while the purpose of the overrunning clutch in direct speed is to obtain a reduction in fuel necessary to operate the car. It is estimated that during one-third of the total driving time, either in traffic or in rolling country, the car is slowing down. During these slowing down periods either the car is unnecessarily slowed down by the drag of the engine or the engine must be operated at a speed corresponding to the car speed. In the former case more fuel must be used to accelerate the car, while in the later excess fuel must be used to keep the engine operating at car speed during these periods.

With my improved transmission the driven members are free to overrun the engine so that during slowing down periods the engine may be run at idling speed. The saving in fuel resulting from idling the engine while the car is coasting down hills or slowing down in traffic is very appreciable.

Further, the engine of the car is immensely benefited by use of this transmission because it eliminates a source of oil pumping with its consequent carbon deposits. With the ordinary transmission during slowing down periods the engine is usually driven by the car and the throttle valve is closed so that a high vacuum is obtained in the engine cylinders. This results in oil being drawn from around the sides of the pistons into the combustion chambers where it is burned and forms carbon deposits.

Still a further object of my invention is to provide a transmission in which the driven shaft is normally free to overrun the second speed gear and which may be conveniently shifted so that the engine may be used as a brake when descending steep hills. I have provided means for normally coupling the second speed gear positively to the driven shaft by a simple movement of the shift lever to thereby utilize this engine braking action when desired. More specifically, my structure is provided with a low speed gear slidably mounted on the driven shaft splines, and a second speed gear connected through an overrunning clutch to this shaft. When it is desirable to use the engine as a brake, means are provided for coupling the second speed gear to the low speed gear so that a positive drive is obtained from the second speed gear to the driven shaft.

Still a further object of my invention is to provide a novel means for universally mounting my gear shifting lever which means will be exceptionally easy to assemble and provide a non-rattling oil-tight seal between the lever and the transmission housing.

Still a further object of my invention is to provide a manually operable stop whereby the shifting lever is normally restricted in its travel so as to correctly mesh with the second speed gear whereby the wheels may overrun the engine, which stop may be conveniently operated by the driver from the control or free end of the lever so that a further travel of the lever is permitted to thereby positively couple the engine and second speed gear thereby allowing the engine to be used as a brake in this speed. This controlling device or stop is of simple and inexpensive construction and provides an improved means for obtaining five operative positions for the conventional gear shifting lever.

With these and other objects in view my invention consists in the arrangement, construction, and combination of the various parts of my improved device, as described in the specification, claimed in my claim, and illustrated in the accompanying drawing, in which:

Figure 1 shows a vertical central sectional view through my improved transmission.

Figure 2 shows a sectional view taken on the line 2—2 of Figure 1, and

Figure 3 shows a sectional view taken on the line 3—3 of Figure 1.

Referring to the accompanying drawing, I have used the reference numeral 10 to indicate generally a transmission housing secured to the rear face of an engine clutch housing 11. The upper portion of the housing 10 is enclosed by means of a cover plate 12 in which the gear shifting mechanism is mounted. I have provided a drive gear 13 formed integral with the rear end of a clutch shaft 14 which is driven by the engine clutch. The drive shaft 14 adjacent to the gear 13 is rotatably mounted on a ball bearing 15 in the forward wall of the housing 10 so that the gear extends into the housing.

The gear 13 is provided with an axial bore 16 into which the forward end of a driven shaft 17 is rotatably mounted by means of a roller bearing 18. This driven shaft 17 extends out through the rear wall of the housing 10, in which it is rotatably mounted by a second ball bearing 19.

I have provided a conventional jack shaft 20 secured to the lower part of the housing 10 parallel to the driven shaft 17 upon which a cluster gear 21 is rotatably mounted by means of a pair of roller bearings 22. This cluster gear 21 is of the conventional type having a large gear 23 permanently in mesh with the drive gear 13, a second speed gear 24 spaced rearwardly from the gear 23, a low speed gear 25 spaced rearwardly from the gear 24, and a reverse speed gear 26 forming the rear end of the cluster. The gear 26 is in constant mesh with a similar gear 27 which is rotatably mounted at one side of the transmission in the ordinary manner.

The rear half of the shaft 17 is splined at 28 to receive a universal joint hub and to coact with the sliding transmission gears. It will be noted that I have provided a portion 29 of the shaft 17 having a reduced diameter between the drive gear 13 and the splines 17. A second speed sliding gear 32 is rotatably mounted on this reduced portion. Reciprocally mounted on the splines 17 is a low speed sliding gear 30 of such a size that it may be moved into mesh with either of the gear 25 or 27 to thereby drive the car in low or reverse speed in the conventional manner.

I have incorporated an overrunning clutch of the coil expanding type between the second speed sliding gear and the driven shaft 17. This overrunning clutch and gear are assembled into a unit which is reciprocated with the gear 32. Slidably mounted on the forward end of the splines 28 I have provided a cup shaped drive member 31. The gear 32 is rotatably mounted on the reduced portion 29 and is formed integral with a sleeve 33 into which the drive member 31 is rotatably mounted. Thus, the gear 32 is rotatably supported on the reduced portion 29 and on the drive member 31. A shifter collar 34 is formed integral with the rear end of sleeve 33 and is provided with a detachable retaining ring 35 to secure the member 31 in this sleeve.

An annular chamber 36 is formed within the gear 32 and the cup shaped member 31 into which my overrunning clutch operates. This overrunning clutch consists of a helical band 37 having one end anchored at 38 in a suitable opening in the hub portion of the gear 32. Thus, the band 37 is rotated at all times with the gear 32. This spiral band extends into the drive member 31 wherein it is normally free to rotate; however, if a slight resistance is placed on the free end of this band and the gear 32 rotated so as to uncoil it, then the periphery of the band will grip the wall of the chamber 36 which will anchor the free end more firmly to thereby expand the band into driving contact with the member 31 so that the gear 32 and drive member 31 will operate as a unit. It will be readily seen that according to the principles of energized brake bands, very little pressure need be exerted on the free end of the band to start this energizing action.

I have provided a ball 39 which is disposed between the hub portion of the drive member 31 and a conical groove 40 ground in the free end of the band 37. The end of this band member is bent inwardly at 41 to form a stop for the ball 39 so that a one-way clutch is provided between the member 31 and the band 37. This is a conventional form of ball clutch and simply serves to energize the end of the band to start the gripping action so that the gear 32 and the member 31 will be rotated as a unit when the gear is rotated faster than the shaft 17 in the direction expanding the band 37.

I have provided a row of internal clutch teeth 42 machined in the forward end of the gear 32 so that when this gear is being moved forwardly from the position shown in Figure 1, these teeth will mesh with the end portions of the teeth forming the gear 13 to thereby lock these two gear members together. A direct drive is thereby obtained between the drive shaft 14 and driven shaft 17. However, when the gear 32 is moved rearwardly from the position shown in Figure 1, its teeth mesh with the teeth of the gear 24 thereby driving the gear 32 in the same direction but at a reduced speed.

When the gear 32 is being driven either direct or in second speed, the torque is transmitted through the band 37 to the drive member 31 and then to the driven shaft 17. If the shaft 17 is being rotated faster than the gear 32 the band 37 cannot expand into engagement with the drive member 31 so that the shaft overruns the gear. This action occurs when the car is coasting down hill and when the gear 32 is shifted from direct into second speed while the car is in motion.

I have provided a clutch fork 43 which coacts with the shifter collar 34 to reciprocate the gear and overrunning clutch unit. A second set of internal gear teeth 44 are machined in the unit adjacent to the shifter collar 34 and I have likewise provided a male clutch member 45 formed integral with the gear 30 in position so that when the collar 34 is shifted rearwardly to its extreme position the teeth 44 will mesh with the clutch member 45 to thereby lock the gears 32 and 30 together. I have shown the position of the shifter collar 34 in normal second speed by means of the dotted lines 46 so that it will be clear that when the gear 32 is shifted to the normal second speed the teeth 44 will not engage the clutch member 45.

When the gear member 32 is moved to the normal second speed position the drive is obtained from the gear 24, through the gear 32, band 37, member 31, and driven shaft 17. However, when the gear 32 is moved rearwardly to its extreme position, the drive is obtained from the gear 24, through the gear 32, clutch teeth 44 and 45, directly to the driven shaft 17. It will be noted that in the former case the shaft 17 is free to overrun the driving gears but in the latter case the shaft 17 is positively coupled to the driving gears at all times.

Means are shown for shifting the sliding gears 30 and 32 which consists of a lever 47 pivotally mounted at 48 in the upper end of a bracket 49 extending from the cover plate 12. The fork 43 is secured to a shaft, not shown in the drawing but which is reciprocally mounted in the cover plate. Likewise, a fork 50 is provided to reciprocate the gear 30 and is secured to a shaft 51 reciprocally mounted in the cover plate 12. The hub portions of these forks are provided with notches 52 into which the lower end of the shifter lever 47 extends to selectively reciprocate the forks in the conventional manner.

Means are secured to the lower end of the lever 47 which permits sliding the gear 32 rearwardly only to the normal position shown at 46. The lower end of the lever 47 is grooved at 61 into which a rod 53 is reciprocally mounted. I have provided a clip 54 slidably mounted on the lower end of the lever 47 and which is held from rotation relative thereto by a flat 55 formed on the lower end of this lever. A notch 56 is formed in the lower end of the rod 53 which coacts with the clip 54 so that when the rod 53 is reciprocated it will also reciprocate the clip 54 and a coil spring 57 resiliently urges the clip downwardly on the lever.

An ear 58 extends rearwardly from the clip 54 in position to normally strike against a lug 59, formed on the inside of the bracket 49, when the gear 32 is moved to the position shown by the dotted lines 46. When it is desired to move the clutch teeth 44 into engagement with the clutch member 45, the rod 57 is drawn upwardly which moves the ear 58 also upwardly so that the lever may be shifted to the position wherein the clip is shown by dotted lines 60 to thereby allow the clutch members 44 and 45 to engage.

An arm 62 is hinged at 71 adjacent to the upper end of the shifter lever 47 and a ball 63 is fastened to the top of this lever in position so that both the ball and arm may be gripped by one hand at the same time. The upper end of the rod 53 is pivotally connected at 72 to the intermediate portion of the arm 62 so that when the arm is gripped with the ball the rod will be drawn upwardly to thereby move the ear 58.

Referring to Figure 3, the pivotal mounting 48 of the lever 47 consists of a spherical seat 64 machined in the bracket 49. This seat is so machined that the shifter lever pivot 48 may be inserted therein from the outside of the bracket and will be accurately pivoted for universal movement on this seat 64. That portion of the bracket 49 surrounding the seat 64 is provided with exterior threads 65 threaded so that an inverted cup shaped spherical cap 66 having corresponding threads machined therein may be screwed down over the seat 64. An opening 67 is provided in the central portion of the cap 66 through which the shifter lever 47 and rod 53 extend, there being considerable clearance between the edges of this opening and the shifter lever to thereby permit the universal movement of the lever.

In order to close the opening 67 around the gear shift lever, I have provided a spherical flange 68 which is reciprocally mounted on the lever 47 just above the pivot 48, the outer spherical portion of which coacts with the inside of the spherical cap member 66. It will thus be seen that a self aligning connection is obtained between the flange 68 and the cap 66 thereby forming an oil-tight seat between the lever 47 and the cap 66 which closes the opening 67. A spring 69 is disposed between the pivot 48 and the flange 68 to resiliently urge the pivot into the seat 64 and the flange 68 into the spherical cap 66. Thus, a double oil seal is provided between the shifter lever and the bracket 49 which effectively prevents the transmission oil from oozing out through the universal mounting for the lever.

Means are also provided to prevent rotary movement of the lever 47 relative to the bracket 49 which means consists of a horizontal pin 70 extending through the threaded portion 65 of the bracket 49 in position to enter that portion of the groove 61 within the pivot 48. It will be noted that the cap 66 when threaded down over the upper end of the bracket 49 secures the pin 70 in place so that once the cap 66 is in place the pin 70 is prevented from becoming loose from the bracket 49.

The operation of my improved transmission is identical with that of the ordinary sliding gear transmission with the exception that when it is desired to use the engine as a brake while in second gear, the rod 53 is moved upwarly so that the clutch teeth 44 and 45 may mesh. The gear ratio is in no way changed by this operation, the drive simply being obtained positively instead of through the overrunning clutch member 37.

Among the many advantages arising from the use of my improved device it may be well to mention that I have provided a transmission which will allow the vehicle to overrun the engine thereby creating a saving in fuel under ordinary driving conditions. Further, I have provided an overrunning clutch for the second speed so that the transmission may be silently shifted from direct drive into the second speed at any time, even while the car is in motion, with practically no clashing of the gears. Further, I have provided a convenient means for using the drag of engine as a brake while descending steep hills to thereby insure against failure of the vehicle brakes.

Some changes may be made in the arrangement, construction, and combination of the various parts of my improved device without departing from the spirit of my invention, and it is my intention to cover by my claims, such changes as may reasonably be included within the scope thereof.

I claim as my invention:

A shift lever having a spherical portion formed thereon intermediate of its ends by means of which it is universally mounted in a transmission, said lever having a longitudinal groove therein extending from above the spherical portion down along the lever to position adjacent to the lever actuated elements of the transmission, a rod reciprocally mounted in said groove so that it lies substantially within the lines of the lever, said lever having a portion at its actuated end of reduced diameter so that the adjacent portion of the rod projects outwardly therefrom, said adjacent rod portion having a notch therein substantially aligned with the surface of said reduced portion, a U shaped clip reciprocally mounted on said reduced portion with one arm thereof extending into said notch so as to be actuated by said rod, a spring disposed around said reduced portion and rod resiliently urging the clip to its inoperative position, and a means associated with the other end of said rod whereby it may be manually reciprocated.

LAURENCE S. SHELDRICK.